Oct. 2, 1962 J. W. WEINBERG 3,056,166
LENS MOLD AND APPARATUS
Filed July 20, 1959 2 Sheets-Sheet 1

INVENTOR
JOSEPH W. WEINBERG
BY
Eyre, Mann & Lucas
ATTORNEYS

Oct. 2, 1962     J. W. WEINBERG     3,056,166
LENS MOLD AND APPARATUS

Filed July 20, 1959     2 Sheets-Sheet 2

INVENTOR
JOSEPH W. WEINBERG
BY
ATTORNEYS

United States Patent Office 3,056,166
Patented Oct. 2, 1962

3,056,166
LENS MOLD AND APPARATUS
Joseph W. Weinberg, Cleveland, Ohio, assignor, by mesne assignments, to Bausch & Lomb Incorporated, Rochester, N.Y., a corporation of New York
Filed July 20, 1959, Ser. No. 828,094
3 Claims. (Cl. 18—39)

The present invention relates to the manufacture of lenses from liquid polymerizable synthetic resin monomers that are solidified by heat curing while in a mold, and comprises a novel mold that is suitable for use for production of lenses of precise optical characteristics and of a wide range of powers. Lenses having any desired sphere, cylinder or prism power, and with any desired thickness can be readily formed by the mold of the invention.

Briefly, the new mold comprises a pair of mold parts coupled together by an annular plastic gasket with a spherical concave surface of one mold part facing a convex surface, which may be spherical or sphero-cylindrical, on the other mold part. The two facing surfaces of the mold parts are accurately formed in accordance with specific diopter surface powers to yield in the plastic lens to be formed therebetween the desired sphere and cylinder corrections. The gasket is inserted into the space between the mold parts and the device is held together under the pressure of a clip or other means, hermetically sealing the parts together at the gasket. The gasket is formed with an annular lip, the minimum thickness of which determines the minimum thickness of the lens to be formed. One surface of the lip lies in a plane perpendicular to the axis of the lens to be formed, assuming no prism correction in the prescription. The mold part having the accurately formed concave spherical surface thereon is ground about its periphery to provide a plane annular rim for engagement with the plane annular surface of the lip of the gasket. The other surface of the lip is shaped to conform to the accurately formed convex surface of the other mold part. The gasket, which is preferably of a thermoplastic material such as polyvinyl chloride, is formed in a mold having an annular element therein the outer surface of which conforms accurately with the surface of the mold part to be engaged by the non-planar lip of the gasket. Preferably each gasket is formed with an outwardly extending tab upon which is stamped indicia identifying the diameter and thickness of the lens to be formed and the mold part having the convex surface conforming to the shaped surface of the gasket lip.

When prism power is to be introduced, the plane surface of the gasket lip is formed at a small angle to the axis of the gasket to provide for corresponding decentering of the spherical surface of the lens to be formed. This can be done by simple modification of a stock molded gasket, by the method and apparatus to be described.

Thus the particular conformation of the parts of the molding device of the invention depend upon the optical sphere and cylinder powers for the lens, different gaskets and different mold parts being used in accordance with the desired power of the finished lens. The minimum thickness of the lip of the gasket determines the minimum thickness of the finished lens.

There have been attempts in the prior art to make plastic lenses by polymerizing and solidifying under heat a resin monomer while the monomer is held between two glass molds having opposed concave and convex surfaces as in the molding device of the present invention. (See Beattie Patent No. 2,542,386 and Herman et al. Patent No. 2,728,106.) The device of the Beattie patent is not suitable however, for use when lenses with sphere or cylinder correction are to be formed, because the gasket is not designed to conform to the shape of the mold, nor is the mold designed to conform to a simplified gasket shape in which the flange is adapted to fit a variety of molds incorporating different corrections. The process and molding device described by Beattie could not be used as a practical matter for mass production of lenses with corrective power. Leakage of monomer under sealing pressure, or the severe or uncontrolled deformation of the gasket under the sealing pressure needed to make a seal, introduce errors into the lens formed in the mold, and eventually the excess pressures needed to make a seal are transferred into the lens during a stage when it is fragile, so that the lens would be crushed, or else leakage of air into the mold during polymerization may poison the reaction, and ruin the lens. Air leakage could be prevented by working with an inert atmosphere, as do Herman et al., who operate without a gasket, but this introduces other complications. The stresses introduced by the polymer as it sets will lead to rupture of the lens long before completion of polymerization. Moreover, the lip of the gasket disclosed in the Beattie patent if it were conformed to the mold surface would have to be changed to conform to each concave mold part used therewith. Furthermore, it is necessary to take into account tilt due to the mean coflexure and taper due to spherical power which affect the edge shape of the mold cavity. In the gasket of the device of the present invention, only one surface of the lip, that which is conformed to the convex surface of the lens part employed for forming the concave surface of the lens, is non-planar and the lip abutting on the mold part having the concave surface can be used with any concave mold part of the same diameter. This is a most important feature from the standpoint of commercial production of lenses in the necessary range of powers.

For a better understanding of the invention and of the advantages inherent therein reference may be had to the accompanying drawings of which:

Figure 2A:
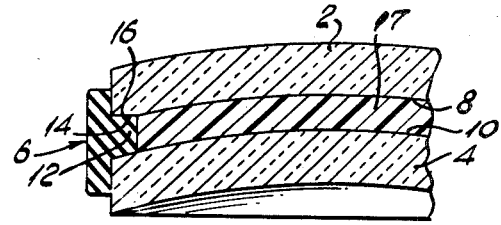
FIG. 2a is an enlarged fragmentary section through the molding device of FIG. 1 taken on the line 2a—2a thereof.
Figure 1:
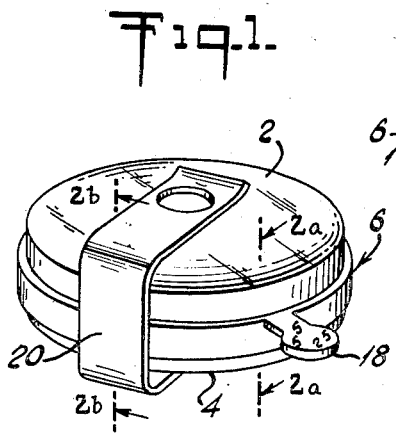
FIG. 1 is a perspective view of a molding device embodying the invention.
Figure 2B:
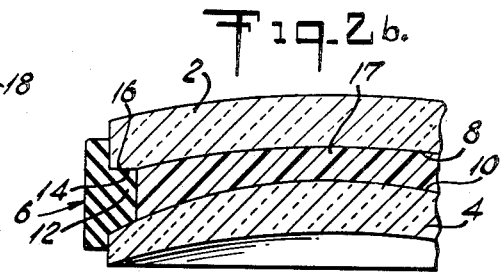
FIG. 2b is an enlarged fragmentary section similar to FIG. 2a but taken at 90° from the view of FIG. 2a and along the line 2b—2b of FIG. 1.
Figure 3:
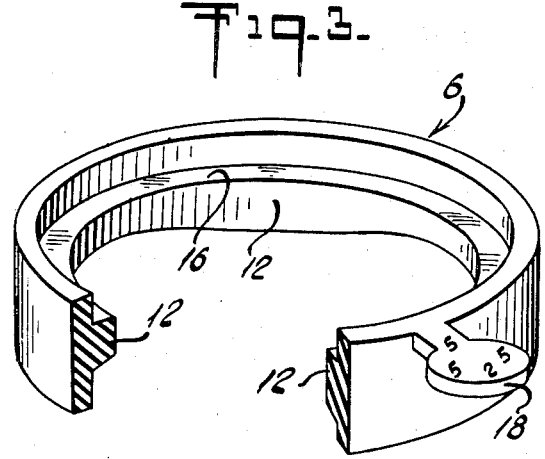
FIG. 3 is a perspective view of the gasket of the molding device of FIG. 1.

Referring now to FIGS. 1, 2a, 2b and 3, the molding device of the invention comprises mold parts 2 and 4 each preferably of glass and a gasket 6 of a plastic material such as polyvinyl chloride, polyisobutylene-modified polyvinyl chloride, or the like. The mold part 2 has an optically ground concave spherical surface 8 and the mold part 4 has an optically ground convex surface 10, the surfaces 8 and 10 facing each other and, at their peripheries, engaging an annular lip 12 on the gasket 6. The mold part 2 is cut about the periphery to form a plane annular surface 14 which engages flush with the plane annular upper surface 16 of the lip 12. The undersurface of the lip 12 of the gasket is shaped to conform with the convex surface 10 of the mold part 4. FIG. 2a is a section through the molding device in the plane of the spherical base curve of surface 10 and FIG. 2b is a similar section in the plane of the cylinder curve of surface 10. It will be noted from a comparison of FIG. 2a with FIG. 2b that the thickness of the lip of the gasket varies from the minimum of FIG. 2a to the maximum of FIG. 2b. It will be understood that FIGS. 1 through 3 represent one particular lens prescription.

The gasket 6 has formed thereon a projecting tab 18 which carries indicia identifying the gasket, giving the base curve, cylinder power, edge thickness and aperture diameter of the mold part 4 to be used therewith.

When a lens is to be formed by the above described molding device, the gasket 6 is pulled away from the mold parts sufficiently to permit introduction through a nozzle or the like of resinous material to be polymerized. In FIGS. 2a and 2b the resinous material is indicated at 17. A spring clip 20 is then slipped over the mold parts to hold them in engagement with the lip of the gasket and then the device is suitably treated to polymerize the resin. The details of the heat treatment form no part of the present invention nor does the particular resinous composition from which the lens is made. For completeness of the description the following brief description both of a suitable heating process and of a suitable material will now be given.

A polymerizable composition comprising monomeric diethylene glycol bis(allyl carbonate) and monomeric ethylene glycol maleate and a polymerization catalyst therefor, the composition containing not less than 7.5% and not more than 20% ethylene glycol maleate, the catalyst being an organic peroxy-carbonate in an amount of at least 5.25%, is introduced into the space between the surfaces 8 and 10. The molding device is then heated within the range of 25° to 120° C. in several stages to bring about initial polymerization and formation of an infusible gel. For example, at the first heating stage the composition is heated at about 40° C. for from 12 to about 16 hours. In the next stage it is heated at about 60° C. for about ½ to 1½ hours. After the second stage of heating the molding device is degreased in vapors of an organic solvent, the vapors removing any polymer adhering to the mold parts and gasket and preheating the mold parts for the final heating stage. A third heating stage is then carried on for about ½ hour at a temperature of about 90° C. The final polymerization is effected under infrared radiation at a temperature of about 175° C. and is continued until polymerization is complete to a hard set, usually in a few minutes.

When a process such as above briefly described is followed, optical lenses of excellent surface characteristics and without internal strain are formed with the molding device of the invention.

It is important that the mold parts 2 and 4 be formed with accurately ground surfaces 8 and 10, respectively, and that the two particular mold parts be selected with reference to the particular lens to be made. It is also important that the surface of the gasket lip which engages the convex surface 10 of the mold part 4 be shaped to seal with such convex surface. The gasket is readily molded to the desired shape in conventional molding equipment, the toroidal surfaces to which the lip conforms can be generated by conventional lap cutting machinery.

When the surfaces 8 and 10 are carefully formed to take into account the index of refraction of the particular resin employed for the lens and the difference in coefficients of expansion of glass and of the resinous material, then optically accurate, dimensionally stable, scratch-resistant and breakage-resistant plastic lenses are produced by the new molding device. A set of mold parts 2 and a set of mold parts 4 are provided that by selection in accordance with the intended powers for the lenes can be used for a wide range of powers. It is not necessary that there be as many different pairs of mold parts as there are different powers, since the same mold part 2 can be used with a number of different mold parts 4 and corresponding gaskets 6 to provide lenses of different sphere power, and different cylinder and prism thickness. Once the mold parts have been prepared and a tabulation showing how they can be combined for different lens powers is made, relatively unskilled workers can prepare gaskets for any prescription and can select the correct mold parts from the tabulation. When the mold part 4 includes cylinder correction the mold part can be oriented by suitable indicia on the gasket and mold. When the prescription includes a bifocal addition, a mold part 2 is selected containing the proper bifocal addition at the proper location in the surface 8 of mold part 2. The bifocal addition may intersect the edge of the main sphere of the lens, and here the gasket must contain a corresponding raised portion. It may also be incorporated in lenses of lenticular design, to make a one piece bifocal lens. Having the bifocal addition on the convex lens surface requires proper orientation with the concave lens surface which carries the cylinder correction. And since such orientation is required, such mounting gives the freedom to accomplish it. Also, it is optically superior to have the bifocal addition on the front surface of the lens in the range of powers from moderate minus up to and including full range of positive powers.

In the foregoing description it has been assumed that the prescription does not require introduction of prism. Where prism is to be introduced, the central normals to the two cooperating mold surfaces must stand at a predetermined angle to one another in a plane that intersects the cylinder surface in a line that makes a predetermined azimuthal angle with the axis of the cylinder power, if any such power is desired. To effect this, in the ordinary gasket, it is necessary to begin with a gasket of thickness equal to the maximum edge thickness in the intended lens. The gasket is then placed in a device in which it is oriented so that the cylinder axis makes the required azimuthal angle with respect to the apex base line A—B that specifies the direction of the prism. The point B will be that point on that line on the side of greater thickness from the optical center and at the outer periphery of the flat lip of the spherical mold part. The plane of the internal flat lip of the gasket mating with the concave mold part is then tilted about an axis passing through the point on that lip at the extremity of the diameter of maximum thickness and lying in the plane of that lip, and tangent to the circle defining the inside corner of the lip, through the angle of prism desired, that is, the intended angle between the central normals of the two mold surfaces already described. The device now to be described achieves these ends.

Figure 4:
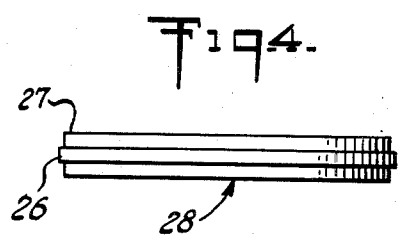
FIG. 4 is a side view of a gasket suitable for use when the lens is to incorporate prism power.

The gasket is preferably made with an external rim such as shown at 26 in the gasket 28 of FIG. 4. The gasket is designed so that the top surface 27 of the gasket is an annulus in a plane precisely parallel to the plane of the sphere lip and at a distance therefrom uniform throughout the entire series of gaskets. The surface 27 is used to locate the gasket within the device intended to introduce prism. The rim 26 permits the gasket to be supported in the proper orientation within the device and to bring its surface 27 into engagement with the lower surface of the cover 62, there to be firmly retained by the action of the knurled flange 60. The gasket 28 will have an internal lip as in the case of the gasket of FIG. 3 which may or may not be one designed for use with a mold part 4 having cylinder power. A gasket having such rim 26 can be placed in a device such as is shown in FIGS. 5 and 6 to have the plane of the upper surface of the lip shifted through the desired angle, characteristic in the prism power, as above described.

Figure 5:
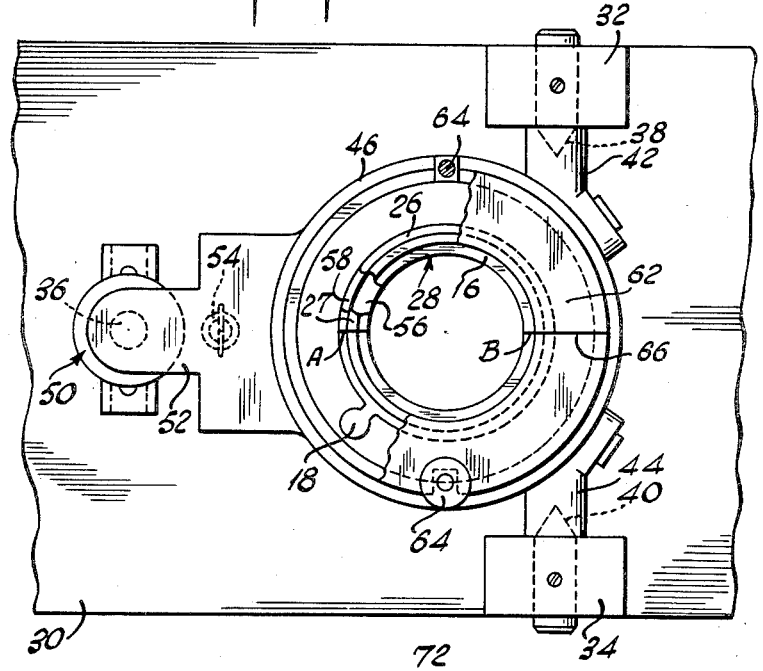
FIG. 5 is a top plan view of a device for use in changing the angle of the plane surface of the gasket lip when prism power is to be introduced in the finished lens.
Figure 6:
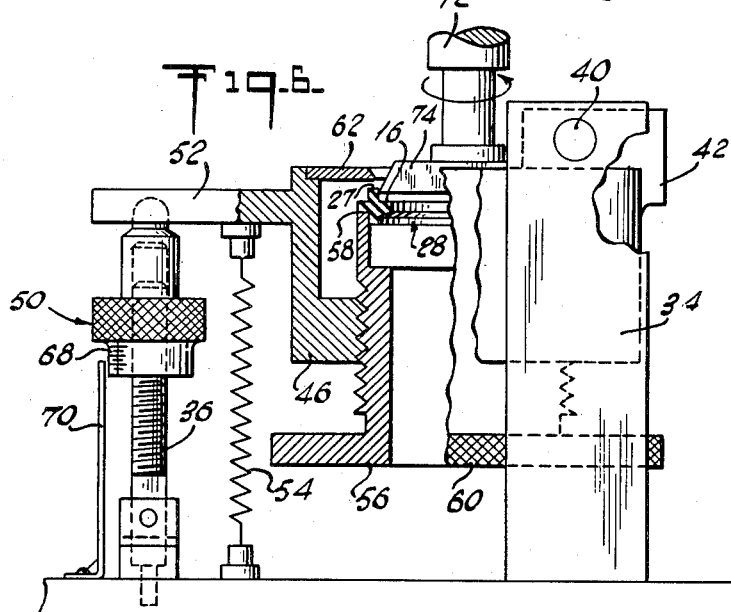
FIG. 6 is a side view partly in section of the device of FIG. 5.

The device of FIGS. 5 and 6 comprises a base 30 upon which is mounted two stanchions 32 and 34 and a threaded rod 36. Stanchions 32 and 34 are fixed to the base and carry aligned pivots 38 and 40 which are received in bearings 42 and 44 mounted on the outer surface of a cylindrical element 46. Threadedly mounted on the upper end of the rod 48 is a member 50 upon the upper rounded end of which rests an arm 52 secured to the outer wall of the cylindrical element 46. The arm 52 is held in engagement with the upper part of the member 50 by a tension spring 54 one end of which is secured to the underside of arm 52 and the other end of which is secured to the base 30. The stanchions 32 and 34 and the rod 36 provide a three point support for the cylindrical element 46. By adjustment of the level of the threaded member 50 on the rod 48 the cylindrical member 46 may be rocked about the axis of the pivots 38 and 40 to change the angular disposition of the axis of the cylindrical member.

A cylindrical element 56, having a gasket supporting annular surface 58 is screw-threadedly mounted within the member 46. A lower annular flange 60, preferably knurled about its periphery, is provided for adjustment of the level of the gasket within the member 46. A flat cover ring 62 rests on a shoulder formed in the upper end of the member 46 and is adapted to be clamped therein by nuts 64 which are threaded on lever arms pivotally mounted in the side walls of the member 46, there being provided cooperating cutouts in the ring 62 and slots in the wall of member 46. At one point on the inner periphery of the cover ring 62 is a locating notch 66 which, when the cover ring is clamped in place is diametrically disposed with respect to the point of support of the arm 52 by the member 50.

In operation, when a gasket, such as that of FIG. 4, is positioned within the element 56 with the undersurface of the outer rim 26 resting upon the surface 58, the inclination to the horizontal of the plane of the upper surface 16 of the internal lip of the gasket is horizontal, initially as determined by the setting of the member 50 on the threaded rod 48. The cover 60 is set loosely in position, and next, the gasket is oriented on the surface 58 to bring the point B into coincidence with the line of the locating notch 66 as marked on the cover. The knurled flange 60 is then rotated to bring the upper edge 27 of the gasket into engagement with the undersurface of the cover ring 60. A rotatable vertical spindle 72, driven by any suitable means, and carrying a radially disposed tool 74 having a knife edge, is then lowered to bring the knife edge into passive contact, i.e., just clearing, the surface 16 of the gasket lip.

Figure 7:
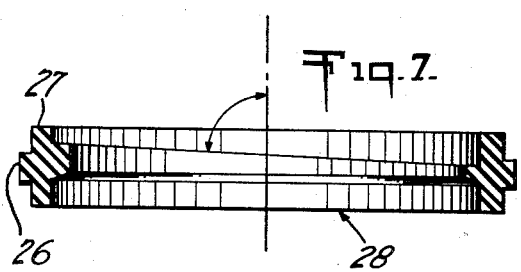
FIG. 7 is a side view of the molding device of the present invention in which the gasket is shown in cross section to illustrate the angle of the plane surface of the finished gasket lip when prism power is to be introduced into the finished lens.

On the outer surface of member 50 is a scale 68 and fixedly mounted on the base 30 is a plate 70 to the upper edge of which cooperates with the lines of the scale 68 to give the angle of inclination to the horizontal of the plane of the upper lip 16. The member 50 is continuously advanced on the threaded rod 48 from its horizontal position to the desired oblique or tilted position, and during this adjustment the knife is continuously cutting the lip to the desired degree. When the mold sphere is now placed in position on the cut lip, it assumes a position with respect to the other mold part that introduces into the lens the required amount of prism in the desired direction and with the desired outer lens thickness. The finished gasket with the top surface of gasket lip 16 having the desired angle of inclination to the horizontal is illustrated in FIG. 7.

The invention has now been described with particular reference to the production of lenses having sphere, cylinder and prism power. Although the mold of the invention is particularly designed for the production of such type of lenses it can equally well be employed for production of lenses having only spherical power, or of lenses having no power, such as plano lenses. For such lenses the convex mold part 4 will have a spherical surface 10 and the undersurface of the lip of the gasket will be of corresponding concave spherical curvature to conform to such surface. Also for such lenses of no cylinder power, the concave spherical curvature of the surface of the lip can be, and preferably is, continued through the wall of the gasket to the outer periphery thereof. When the curvature so extends to the periphery of the gasket the same mold part can be used with gaskets of different diameter.

From the foregoing description it will be apparent that the invention provides apparatus that can be efficiently employed in the production of a wide range of plastic lenses. The invention requires only a selection of preformed parts to insure optically excellent products. Obviously various changes in the specific material suggested for use either for the lens itself or for the particular elements of the molding device could be made without departing from the spirit of the invention or the scope of the accompanying claims. For example, although glass mold parts having ground optical surfaces are preferred, mold parts of other materials inert to or nonreactive with the monomer such as steel, aluminum, chromium plated metal and thermosetting plastics, such as phenol-formaldehyde resins, could be employed. Although polyvinyl chloride and polyisobutylene-modified polyvinyl chloride, have been suggested as materials for the gasket, other materials that can be molded into a relatively resilient composition that is not reactive with the monomer composition employed for the lens itself could be employed for the gasket. While the new machine for introduction of prism power has been described with particular reference to the new gasket having a lip with a planar surface, obviously by suitable orientation and shape of the cutting surface of the rotating knife, the machine could be employed with other types of gasket. Other variations within the scope of the invention will be apparent to those skilled in the art.

It will be apparent from the above description that the mold of the invention is applicable to the production of all types of optical articles of high precision and optical accuracy, such as lenses for binoculars, microscopes, loupes, telescopes, and magnifying glasses, prisms, convex and concave mirrors and the like. It is of especial application for the manufacture of ophthalmic lenses and therefore it has been described with particular reference to such type of lenses.

What is claimed is:

1. In plastic lens molding devices comprising one mold part having an optically curved convex surface adapted to mold the concave surface of a lens and a second mold part having an optically curved concave surface adapted to mold the convex surface of the same lens, the improvement which comprises an annular rim surface positioned adjacent the periphery of the concave surface of said second mold part, said annular surface being positioned to lie in a single plane perpendicular to the axis of the lens to be formed and an annular gasket having an internal lip which fits between the mentioned surfaces of the mold parts, the surface of said lip on one side being shaped to conform to the convex surfaced mold part and the surface of the lip on the second side being shaped to conform to said annular rim surface whereby the second side of said lip will interchangeably receive any number of concave surfaced mold parts having said annular rim surface.

2. The mold according to claim 1 wherein said convex surface of said second mold part is formed with a spherical base having a cylinder imposed thereon whereby a lens molded in said device will have cylinder correction.

3. A mold for use in production of lenses of polymerizable resinous material comprising one mold part having an optical spherical concave surface defining the convex surface of the lens to be molded, a second mold part having an optical curved convex surface defining the concave surface of the lens to be molded and an annular gasket coupling said mold parts together with the concave surface of said first mold part facing the convex surface of said second mold part, said first mold part having a planar annular rim and said gasket having an internal lip one surface of which is planar to engage said annular rim and the other surface of which is shaped to conform to the curvature of the convex surface of said second mold part, the minimum thicknesses of said lip determining the minimum thickness of the lens to be formed wherein the plane of said one surface of the lip of said gasket is inclined through a predetermined angle and a predetermined direction for introduction of prism power.

References Cited in the file of this patent

UNITED STATES PATENTS

| | | |
|---|---|---|
| 465,540 | Saltzkorn | Dec. 22, 1891 |
| 467,414 | Hughes | Jan. 19, 1892 |
| 2,542,386 | Beattie | Feb. 20, 1951 |
| 2,728,106 | Herman et al. | Dec. 27, 1955 |
| 2,890,486 | Crandon | June 16, 1959 |